United States Patent
Sakaguchi et al.

(10) Patent No.: US 12,008,845 B2
(45) Date of Patent: Jun. 11, 2024

(54) VEHICLE CONTROL DEVICE

(71) Applicant: Hitachi Astemo, Ltd., Ibaraki (JP)

(72) Inventors: Tomoyasu Sakaguchi, Hitachinaka (JP); Masashi Seimiya, Hitachinaka (JP); Yoshitaka Fukasawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 434 days.

(21) Appl. No.: 17/423,945

(22) PCT Filed: Jan. 21, 2020

(86) PCT No.: PCT/JP2020/001807
§ 371 (c)(1),
(2) Date: Jul. 19, 2021

(87) PCT Pub. No.: WO2020/170688
PCT Pub. Date: Aug. 27, 2020

(65) Prior Publication Data
US 2022/0084330 A1   Mar. 17, 2022

(30) Foreign Application Priority Data
Feb. 22, 2019   (JP) ................. 2019-030951

(51) Int. Cl.
*G07C 5/04* (2006.01)
*G01D 5/14* (2006.01)
(Continued)

(52) U.S. Cl.
CPC ............... *G07C 5/04* (2013.01); *G01D 5/244* (2013.01); *G01P 13/04* (2013.01); *G01D 5/145* (2013.01)

(58) Field of Classification Search
CPC .......... G07C 5/04; G01D 5/244; G01D 5/145; G01P 13/04
See application file for complete search history.

(56) References Cited

U.S. PATENT DOCUMENTS 4,442,532 A   4/1984 Takemura
6,554,094 B1   4/2003 Bell et al.
(Continued)

FOREIGN PATENT DOCUMENTS

JP   H10-38585 A    2/1998
JP   2009-14642 A   1/2009
JP   2010-271142 A  12/2010

*Primary Examiner* — Helen C Kwok
(74) *Attorney, Agent, or Firm* — Volpe Koenig

(57) ABSTRACT

A vehicle control device includes a counting unit that counts rotation of wheels by a sensor; and a rotation determination unit that determines the rotation based on a count value of each of the wheels obtained by the counting unit. Based on a movement distance of a vehicle, the movement distance of each of the wheels from rotation detection to the next rotation detection is defined as a rotation detection travel distance of each of the wheels. The rotation determination unit determines a rotation direction of a wheel a second time is a direction opposite to that detected for a first time when rotation detection is not performed even once for a first reference wheel having a rotation detection travel distance equal to or less than a rotation detection travel distance of the first determination target wheel while the rotation of the selected first determination target wheel is detected twice.

9 Claims, 7 Drawing Sheets

(51) Int. Cl.
 *G01D 5/244* (2006.01)
 *G01P 13/04* (2006.01)

(56) References Cited

U.S. PATENT DOCUMENTS

| | | | |
|---|---|---|---|
| 2007/0139036 A1* | 6/2007 | Kondo | G01P 3/486 |
| | | | 324/179 |
| 2008/0122809 A1* | 5/2008 | Kim | G06F 3/0362 |
| | | | 345/184 |
| 2010/0225308 A1 | 9/2010 | Kurumado et al. | |
| 2011/0125456 A1* | 5/2011 | Kurumado | G01P 3/488 |
| | | | 702/147 |

* cited by examiner

|  | RIGHT FRONT WHEEL | LEFT FRONT WHEEL | RIGHT REAR WHEEL | LEFT REAR WHEEL |
|---|---|---|---|---|
| RIGHT FRONT WHEEL | — | CntAB | CntAC | CntAD |
| LEFT FRONT WHEEL | CntBA | — | CntBC | CntBD |
| RIGHT REAR WHEEL | CntCA | CntCB | — | CntCD |
| LEFT REAR WHEEL | CntDA | CntDB | CntDC | — |

VEHICLE CONTROL DEVICE

TECHNICAL FIELD

The present invention relates to estimation of a wheel rotation direction using a wheel speed sensor, which can be used for estimation of an own vehicle position such automatic driving of a vehicle, automatic parking, and car navigation.

BACKGROUND ART

When a wheel speed sensor is used in estimation of an own vehicle position used in automatic driving, automatic parking, and the like, it is important to know a wheel rotation direction. In the own vehicle position estimation using the wheel speed sensor, for example, a movement amount of an own vehicle is estimated from an average rotation amount of left and right rear wheels, and a turning amount of the own vehicle is estimated from a difference in rotation amount between the left and right rear wheels (a steering angle is sometimes used as the turning amount). The rotation amount is calculated from a count of wheel speed pulses, and the wheel rotation direction is calculated from a gear position (D range/R range or the like) of the vehicle.

The wheel rotation direction during traveling can be easily determined from the gear position and the like. However, the wheel rotation direction when the vehicle is about to stop or when the vehicle collides with a step or the like sometimes differs from the gear position or the like due to the reaction of braking or the influence of bouncing, and thus, is difficult to determine. There is also a wheel speed sensor that outputs the wheel rotation direction, but detection of a change in the rotation direction is sometimes delayed. If information from the wheel speed sensor in the state of determining a wrong wheel rotation direction, the movement amount of the own vehicle and the turning amount of the own vehicle become inaccurate, so that the accuracy of the own vehicle position estimation decreases. This has a large effect particularly in an automatic parking system where accuracy of several centimeters is important.

The measurement of the rotation amount using the wheel speed sensor often uses a value of a counter that is counted whenever a wheel passes a specific rotation angle position by rotation. For example, when there are 100 counts during one rotation of the wheel, a rotation amount is about 3.6 degrees per count, and a travel distance of the wheel per count can be estimated if the travel distance per rotation of the wheel is known.

However, it is known that this counter counts regardless of the wheel rotation direction. When the rotation direction changes, there may be a case where the wheel rotates in the reverse direction immediately after the wheel has passed a certain rotation angle position to pass a rotation angle position at the specific angle position, and the counter counts again. For example, there is a case where reverse rotation starts when forward rotation by 0.1 degrees is performed after the first count, and the counter counts again when the reverse rotation is performed by 0.1 degrees although the rotation amount of 3.6 degrees per count is normally required.

At this time, if a count obtained by reverse rotation is mistaken for a count obtained by forward rotation, it is estimated that the wheel, which has originally advanced by 0.1 degrees and returned by 0.1 degrees, has advanced by 3.6 degrees. This makes the position of the wheel mistakenly estimated for 3.6 degrees. If this is directly reflected in the own vehicle position estimation, the estimation accuracy of the movement amount and the turning amount is lowered, and as a result, the accuracy of the own vehicle position estimation is lowered.

PTL 1 discloses that a rotation amount of a wheel is acquired as a count value and used to estimate a position of an own vehicle, but any rotation direction of rotation that causes an increment is not determined for each increment of the count value.

CITATION LIST

Patent Literature

PTL 1: JP H10-038585 A

SUMMARY OF INVENTION

Technical Problem

Hereinafter, detection of a wheel passing a specific rotation angle position performed by a wheel speed sensor is referred to as rotation detection. In a case where the number of times of rotation detection is counted by the wheel speed sensor, it is important to correctly determine that rotation detection, counted when the wheel rotates in the reverse direction, for example, due to swing-back of the vehicle at the time of the vehicle stop or bouncing on a step, is a count caused by the reverse rotation.

Solution to Problem

One aspect of the present disclosure is a vehicle control device that is provided in a vehicle including a plurality of wheels and determines a rotation direction of a wheel included in the plurality of wheels using a sensor that detects rotation of each of the wheels whenever each of the wheels of the plurality of wheels passes a predetermined rotation angle position. The vehicle control device includes: a counting unit that counts rotation detection of each of the wheels by the sensor; and a rotation determination unit that determines a rotation direction of a selected determination target wheel based on a count value of the rotation detection of each of the wheels obtained by the counting unit. A movement distance of each of the wheels from rotation detection to next rotation detection is defined as a rotation detection travel distance of each of the wheels using a movement distance of a predetermined position of the vehicle as a reference. The rotation determination unit determines that a rotation direction of rotation of a first determination target wheel detected for a second time is a direction opposite to a rotation direction of rotation detected for a first time when rotation detection is not performed even once for a first reference wheel having a rotation detection travel distance equal to or less than a rotation detection travel distance of the first determination target wheel while the rotation of the selected first determination target wheel is detected twice.

Another aspect of the present disclosure is a vehicle control device that is provided in a vehicle including a plurality of wheels and determines a rotation direction of a wheel included in the plurality of wheels using a sensor that detects rotation of each of the wheels whenever each of the wheels of the plurality of wheels passes a predetermined rotation angle position. The vehicle control device includes: a counting unit that counts rotation detection of each of the wheels by the sensor; and a rotation determination unit that determines a rotation direction of a selected determination target wheel based on a count value of the rotation detection of each of the wheels obtained by the counting unit. A movement distance of each of the wheels from rotation detection to next rotation detection is defined as a rotation detection travel distance of each of the wheels using a movement distance of a predetermined position of the vehicle as a reference. The rotation determination unit determines that a rotation direction of rotation of a first determination target wheel detected for a second time is a direction opposite to a rotation direction of rotation detected for a first time when rotation detection is performed an even number of times for a first reference wheel having a rotation detection travel distance longer than a rotation detection travel distance of the first determination target wheel while the rotation of the selected first determination target wheel is detected twice.

Advantageous Effects of Invention

According to one aspect of the present invention, it is possible to detect a reverse rotation count of a wheel speed sensor due to vehicle swing-back immediately before a vehicle stop or vehicle bouncing on a step.

DESCRIPTION OF EMBODIMENTS

Hereinafter, an embodiment of the present invention will be described with reference to the drawings. Note that, in each of the drawings, members or elements having the same operation or function will be denoted by the same reference signs, and redundant descriptions thereof will be omitted as appropriate.

Figure 1:
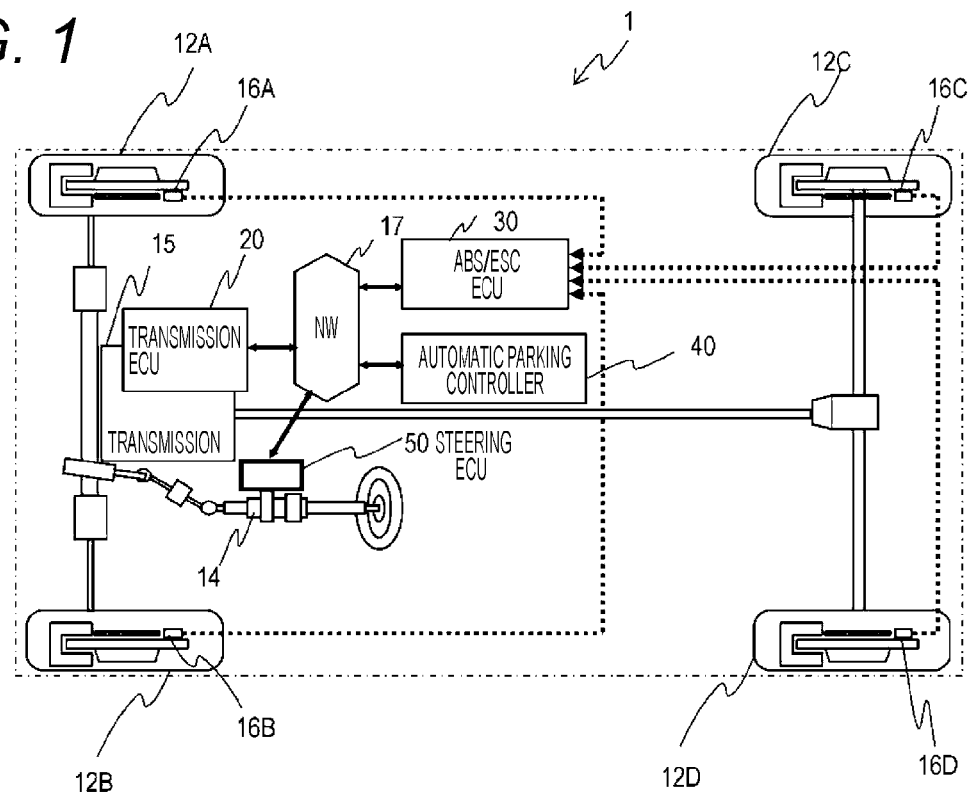
FIG. 1 is an overall configuration diagram illustrating an example of a vehicle control system provided with a wheel reversal detection system.

FIG. 1 is an overall configuration diagram illustrating an example of a vehicle control system 1 provided with a wheel reversal detection system according to the embodiment. The wheel reversal detection system includes: wheel speed sensors 16A to 16D respectively corresponding to wheels; and an anti-lock brake system (ABS)/electronic stability control (ESC) electronic control unit (ECU) 30 connected to the wheel speed sensors 16A to 16D.

The wheel speed sensors 16A to 16D detect the rotation of the corresponding wheels 12A to 12D, respectively. In the rotation detection, the wheel passing a specific rotation angle position is detected. Details of a configuration of the wheel speed sensor will be described later with reference to FIG. 4. The ABS/ESC ECU 30 counts the number of times of wheel rotation detection performed by each of the wheel speed sensors 16A to 16D.

The wheel reversal detection system also includes: a transmission ECU 20 connected to a gear position sensor (not illustrated in FIG. 1) in a transmission 15; a steering ECU 50 connected to a steering angle sensor (not illustrated in FIG. 1) in a steering mechanism 14; and an automatic parking controller 40. The transmission ECU 20, the ABS/ESC ECU 30, the automatic parking controller 40 and the steering ECU 50 are connected to a communication network (NW) 17. The automatic parking controller 40 acquires information on a gear position (D range/R range or the like) from the transmission ECU 20, information on wheel detection from the ABS/ESC ECU 30, and information on a steering angle from the steering ECU 50 via the NW 17.

Figure 2:
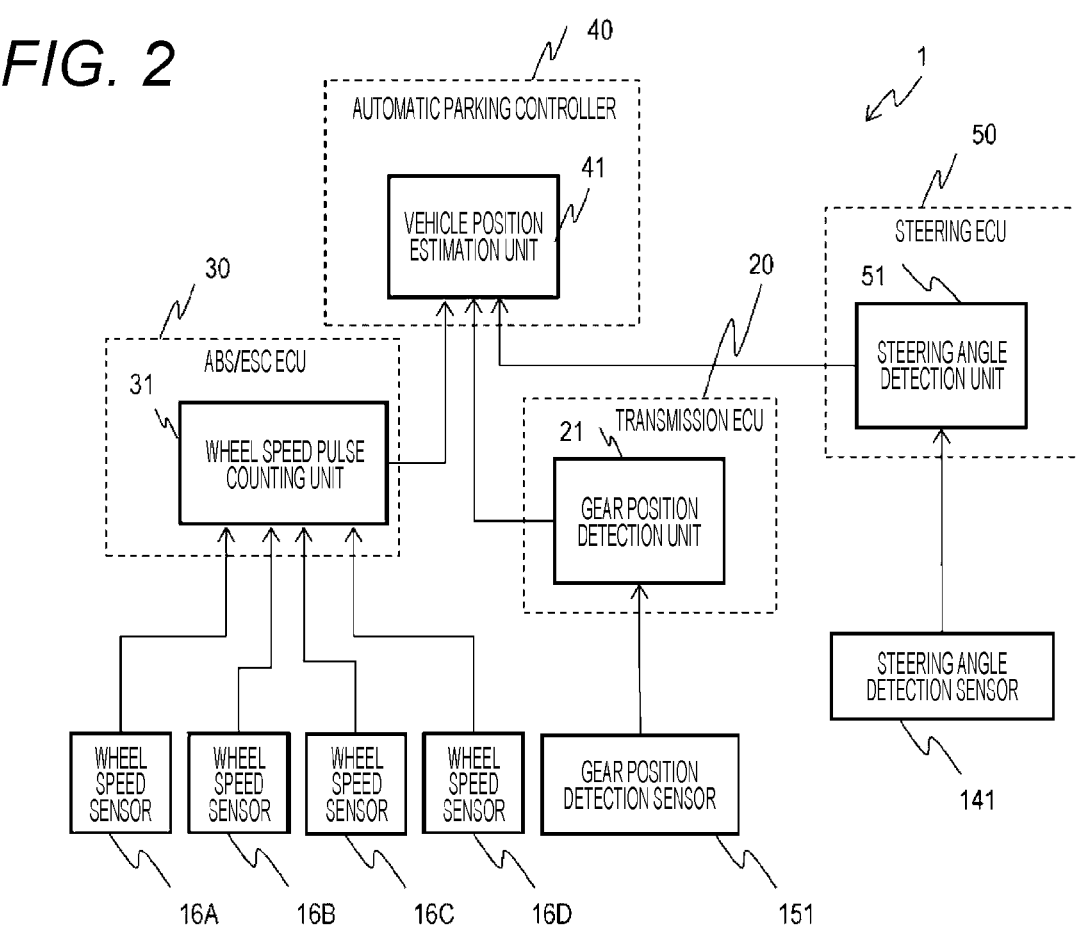
FIG. 2 is a logical configuration diagram illustrating an example of a vehicle control system provided with the wheel reversal detection system.

FIG. 2 is a logical configuration diagram illustrating an example of the vehicle control system 1 provided with the wheel reversal detection system according to the embodiment. The transmission ECU 20 includes a gear position detection unit 21 that detects a gear position based on a signal from a gear position detection sensor 151. The ABS/ESC ECU 30 includes a wheel speed pulse counting unit 31 (an example of a counting unit) that counts wheel speed pulses from the wheel speed sensors 16A to 16D.

The wheel speed pulse counting unit 31 counts the number of times of wheel rotation detection performed by each of the wheel speed sensors 16A to 16D. The automatic parking controller 40 includes an own vehicle position estimation unit 41 (an example of a rotation determination unit) that estimates an own vehicle position. The steering ECU 50 includes a steering angle detection unit 51 that detects a steering angle of a steering based on a signal from a steering angle detection sensor 141.

Each of functional units of the ECU can be realized by hardware or the collaboration of hardware and software. For example, the functional unit can be realized by a processor that operates according to a program and/or a specific large-scale integration (LSI).

The own vehicle position estimation unit 41 uses the wheel speed pulse count value to estimate the own vehicle position. The own vehicle position estimation unit 41 determines a rotation direction of a selected wheel based on a count value of the rotation detection of each wheel obtained by the wheel speed pulse counting unit 31. For example, the own vehicle position estimation unit 41 determines (estimates) the rotation direction for an increment in the wheel speed pulse count value based on the wheel speed pulse count values of the four wheels output by the wheel speed pulse counting unit 31, the gear position output by the gear position detection unit, and the steering angle output by the steering angle detection unit 51, and reflects the rotation direction in the calculation for the own vehicle position estimation.

Figure 3:
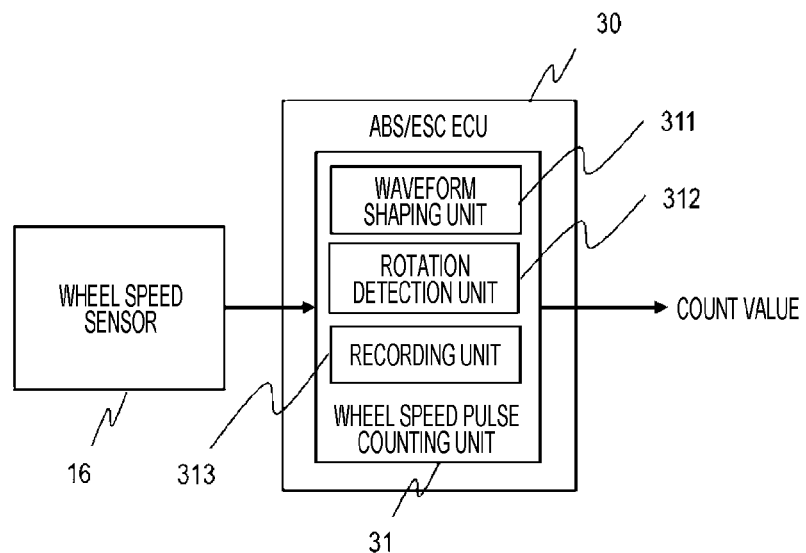
FIG. 3 is a schematic logical configuration diagram illustrating an example of a wheel speed pulse counting unit of a relevant ABS/ESC ECU.

FIG. 3 is a schematic logical configuration diagram illustrating an example of the wheel speed pulse counting unit 31 of the ABS/ESC ECU 30 according to the embodiment. The wheel speed pulse counting unit 31 shapes a signal detected by the wheel speed sensor 16 to generate a pulse signal, and counts and records the number of voltage changes of the pulse signal. The wheel speed sensor 16 represents any one of the wheel speed sensors 16A to 16D.

Specifically, the wheel speed pulse counting unit 31 includes a waveform shaping unit 311, a rotation detection unit 312, and a recording unit 313. The waveform shaping unit 311 shapes signals detected by the wheel speed sensors 16A to 16D to generate pulse signals. The rotation detection unit 312 detects the rotation of a wheel when a pulse signal generated by the waveform shaping unit 311 passes a rising threshold from a low potential side to a high potential side and when a voltage of the pulse signal passes through a falling threshold from the high potential side to the low potential side. The recording unit 313 counts the number of times of rotation detection of each wheel detected by the rotation detection unit 312 and records the resultant in an internal memory.

Figure 4:
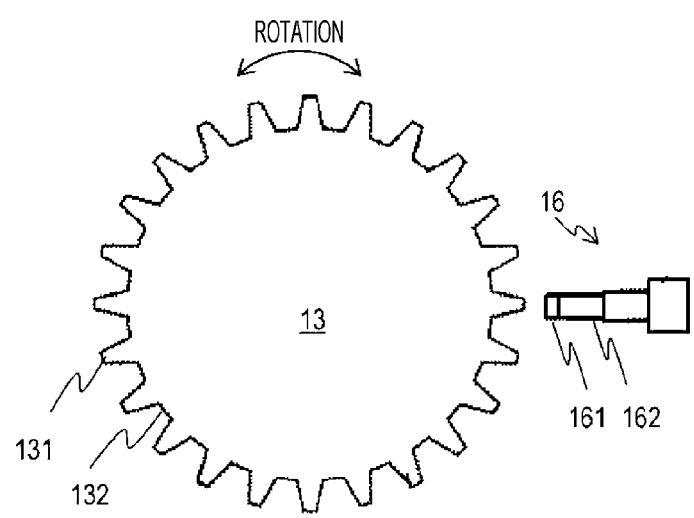
FIG. 4 is a view for describing an example of a mechanism of a wheel speed sensor.

FIG. 4 is a view for describing an example of a mechanism of the wheel speed sensor 16. The wheel speed sensor 16 is a device that sequentially detects that a rotor attached to the wheel has rotated by a predetermined amount and converts the detection result into an electric signal. As illustrated in FIG. 4, a rotor 13 has a plurality of convex portions 131 and concave portions 132 arranged at equal intervals in the circumferential direction, and is attached to, for example, an axle.

FIG. 4 illustrates a configuration example of the electromagnetic pickup type wheel speed sensor 16, and the wheel speed sensor 16 has a magnetized electrode 161 at its distal end. The wheel speed sensor 16 is arranged such that a direction of an axis 162 of the electrode 161 coincides with the radial direction of the rotor 13 and a distal end of the electrode 161 is close to the outer peripheral surface of the rotor 13.

The wheel speed sensor 16 outputs, as an electric signal, a change in voltage generated when the convex portion 131 and the concave portion 132 on the rotor 13 pass the vicinity of the electrode 161 of the wheel speed sensor 16 during the rotation of the rotor 13. Note that the wheel speed sensor 16 may adopt any detection system that can detect the passage of the convex portion 131 and the concave portion 132 during rotation of the rotor 13, and may adopt, for example, other Hall element type, magnetic resistance element (MRE) type, and the like.

In the rotation detection by such a mechanism, the number of times of rotation detection per rotation of the wheel is determined by the number of irregularities of the rotor, and a travel distance per rotation of the wheel is also determined. Therefore, the travel distance per rotation detection of each wheel (referred to as a rotation detection length) can be obtained as the rotation detection length=(travel distance per rotation of the wheel)/(number of times of rotation detection per rotation of the wheel). A travel distance of the wheel can be calculated using the rotation detection length and the number of times of rotation detection, and a travel speed of the wheel can be calculated using the rotation detection length and a rotation detection time interval.

Figure 5:
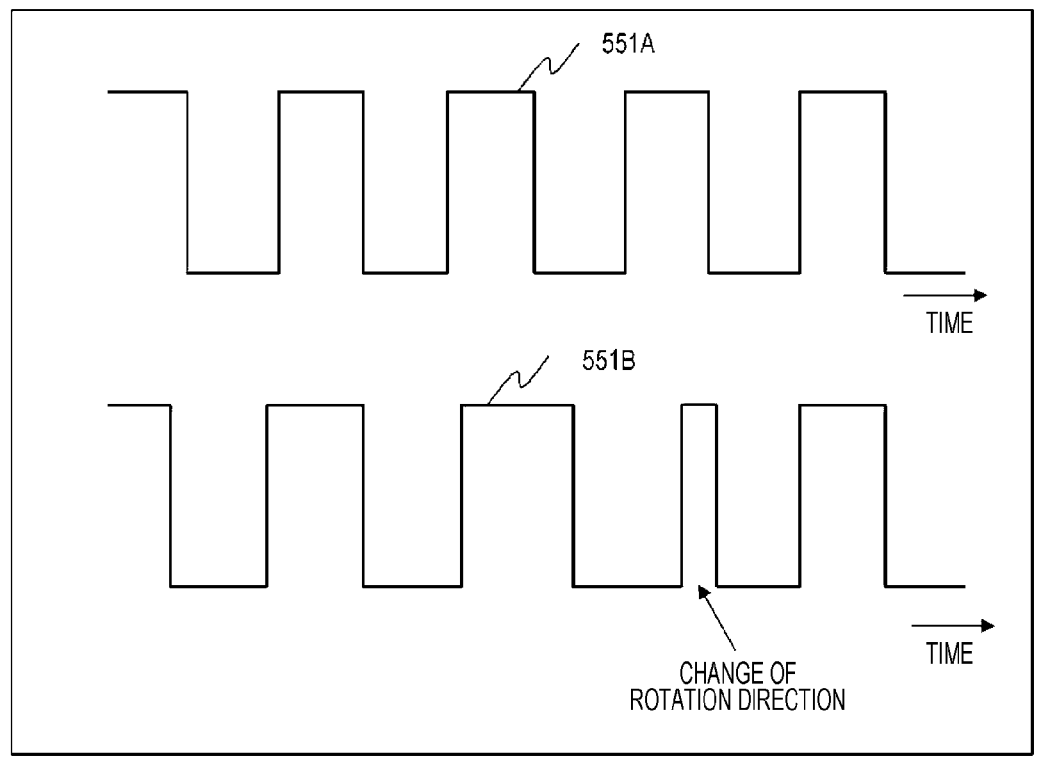
FIG. 5 illustrates examples of two pulse signal waveforms generated by a waveform shaping unit.

FIG. 5 illustrates examples of two pulse signal waveforms generated by the waveform shaping unit 311. In FIG. 5, the horizontal axis represents elapsed time and the vertical axis represents a voltage. A waveform 551A indicates a pulse signal when the rotor 13 is rotating in a constant direction. A waveform 551B indicates a pulse signal when a rotation direction of the rotor 13 is reversed in the middle. As indicated by the waveform 551B, the pulse signal alternately repeats rising and falling regardless of the change in the rotation direction. A time interval between the rising and falling of the pulse signal can usually be obtained the rotation detection length/rotation speed, but is sometimes shorter than such a value when there is the change in the rotation direction.

Figure 6A:
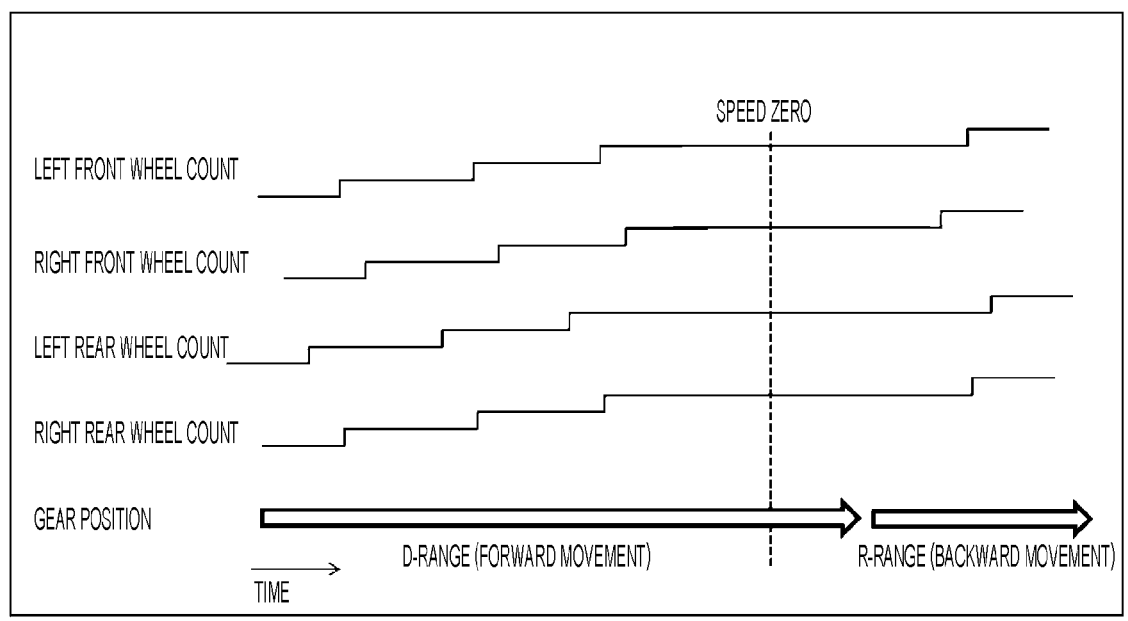
FIG. 6A is a graph for describing how a wheel speed pulse count is incremented when a traveling direction of a vehicle changes.
Figure 6B:
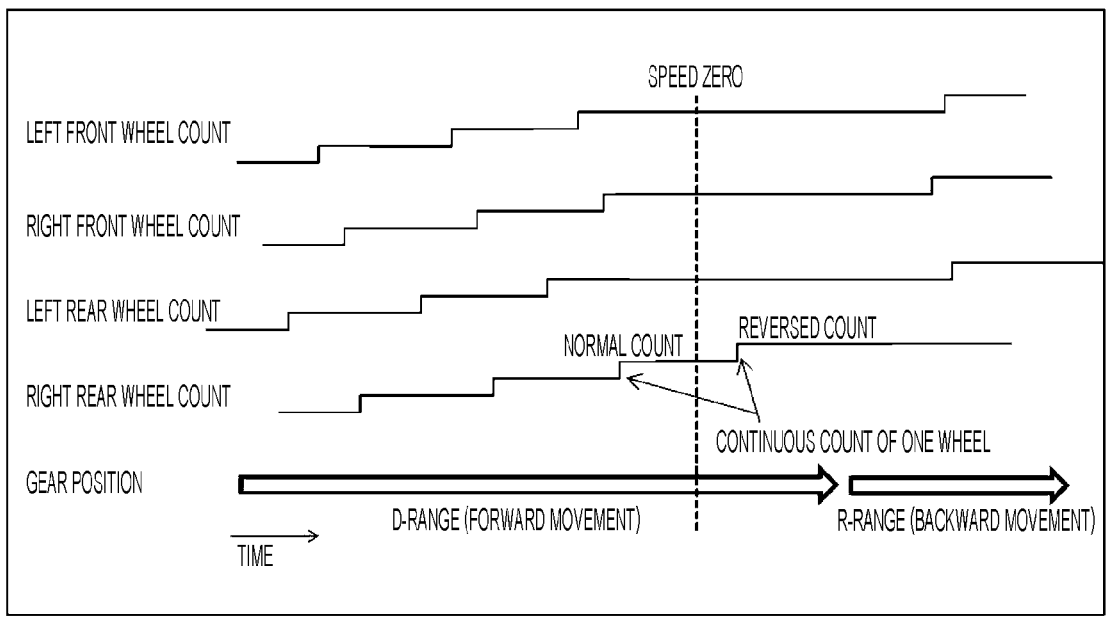
FIG. 6B is a graph for describing how the wheel speed pulse count is incremented when the traveling direction of the vehicle changes.

FIGS. 6A and 6B are graphs for describing how the wheel speed pulse count is incremented when the traveling direction of the vehicle changes. The graphs in FIGS. 6A and 6B illustrate temporal changes of the gear position and the wheel speed pulse count values of the four wheels, respectively. The vehicle stops from a forward movement state, and then, a driver switches the gear position from a forward gear to a reverse gear to start backward movement.

It is assumed that the vehicle moves slightly in the reverse direction (rearward) due to the reaction of deceleration immediately after the speed becomes zero at a time point of speed zero in the graph. As a wheel that has an increment immediately before the speed zero and has only a small rotation amount from the increment to the time point of the speed zero slightly rotates in the reverse direction, an increment is made again.

When the rotation direction is constant, an increment is made per constant rotation amount (one count rotation amount). On the other hand, in the vicinity of switching of the traveling direction in this manner, an increment is made again if there is a rotation amount in the reverse direction equal to or greater than a difference in rotation amount between the last increment time point and the traveling direction switching time point. When the traveling direction of the vehicle is constant, a counting interval of each wheel can be calculated from a rotation amount according to a travel distance in a line of each wheel and a rotation amount of one count, and the order of incrementing the wheel speed pulse count values of the respective wheels can be estimated. In the vicinity of the switching of the traveling direction of the vehicle, the wheel speed pulse count value of the wheel incremented in the vicinity of the switching of the traveling direction is continuously incremented again.

When a wheel speed count is used together with its rotation direction for the own vehicle position estimation, it is assumed that an increment with the forward gear is determined to be an increment caused by rotation of the wheel in the forward direction, and an increment with the reverse gear is determined to be an increment caused by rotation of the wheel in the backward direction. In the example of FIG. 6A, there is no increment caused by the reverse rotation although each wheel has rotated slightly in the reverse direction, so that there is no influence on the own vehicle position estimation. On the other hand, in FIG. 6B, an increment caused by reverse rotation occurs, and the increment of rotation in the backward direction is erroneously recognized as an increment of rotation in the forward direction. This adversely affects the estimation accuracy of the own vehicle position estimation.

Figure 7A:
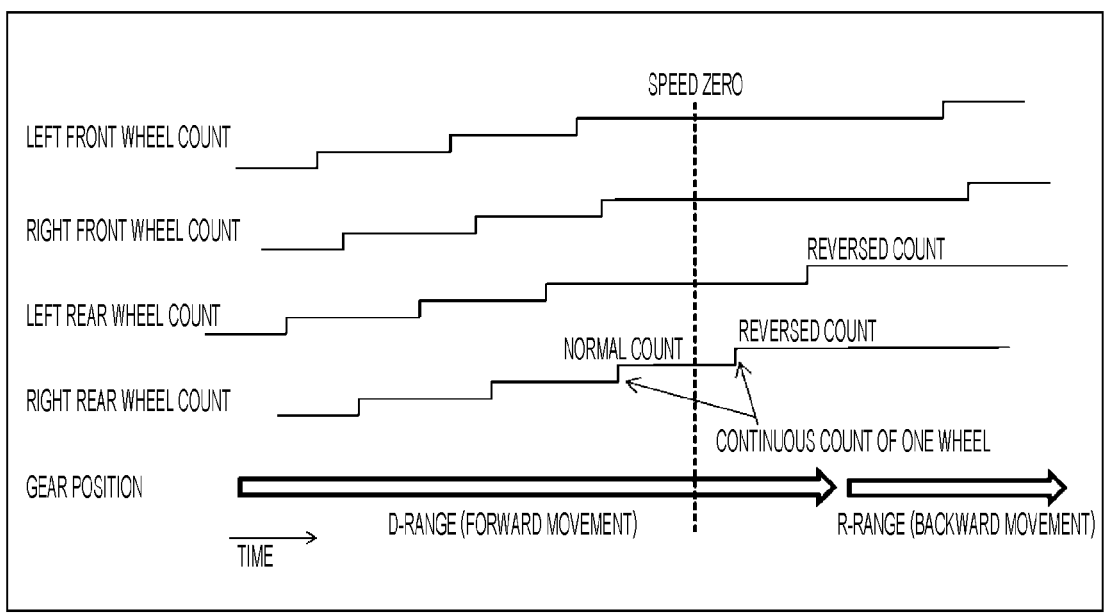
FIG. 7A is a graph for describing how the wheel speed pulse count is incremented when the traveling direction of the vehicle changes.
Figures 7B, 8:
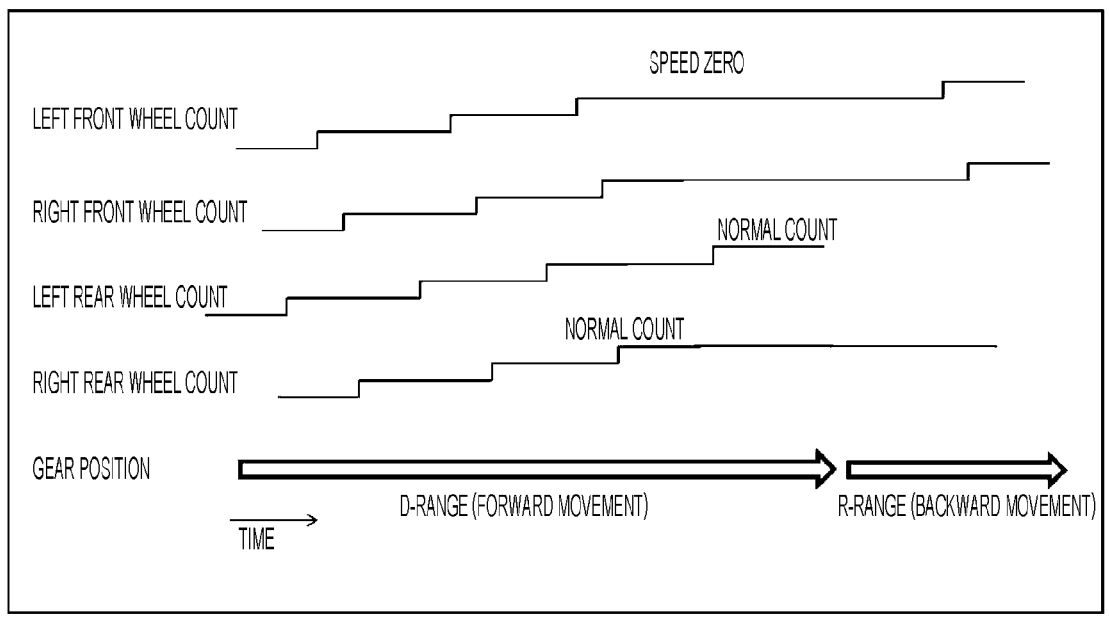
FIG. 7B is a graph for describing how the wheel speed pulse count is incremented when the traveling direction of the vehicle changes.
FIG. 8 illustrates a configuration of a counter configured to calculate the number of increments between increments.

FIGS. 7A and 7B are graphs for describing how the wheel speed pulse count is incremented when the traveling direction of the vehicle changes. The graphs in FIGS. 7A and 7B illustrate temporal changes of the gear position and the wheel speed pulse count values of the four wheels, respectively. In addition to the description with reference to FIGS. 6A and 6B, a description is further added.

With reference to FIGS. 6A and 6B, it has been described that the reverse rotation increment of the wheel occurs as continuous increments in the vicinity of the time point of the speed zero where the traveling direction of the vehicle is switched. On the contrary, the traveling direction is switched between continuous increments of a normal increment and a reverse rotation increment. Therefore, all subsequent increments of wheel speed pulse count values of the respective wheels can be regarded as reverse rotation increments as illustrated in FIG. 7A.

Further, the normal increment and the reverse rotation increment are paired in the vicinity of the time point of switching of the traveling direction. When there is an increment of the other wheel between a normal increment and a reverse rotation increment of one wheel, a normal increment and a reverse rotation increment of the other wheel are paired between the increments of the one wheel, resulting in an even number of increments.

When the number of increments of the other wheel is not an even number between increments of one wheel, a traveling direction of the other wheel is not reversed, and a traveling direction of the one wheel is not reversed either. Therefore, when the number of increments between increments of each wheel is an odd number as illustrated in FIG. 7B, the switching of the traveling direction of the vehicle does not occur.

Figure 9:
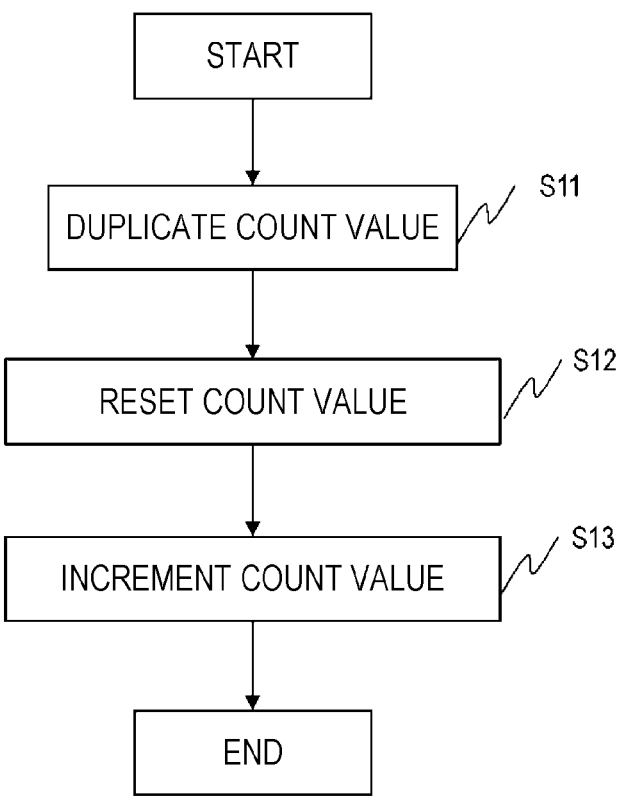
FIG. 9 is a flowchart for specifically describing a procedure of calculating the number of counts between counts between wheels by using the configuration of the counter in FIG. 8.

FIGS. 8 and 9 are views for describing a method of calculating the number of increments of another wheel (referred to as the number of increments between increments) between increments of each wheel. FIG. 8 illustrates a configuration of a counter configured to calculate the number of increments between increments. A row in this table means that counters belonging to the row are reset (returned to an initial value (0)) when rotation is detected on wheels illustrated in the row.

A column in this table means that counters belonging to the column are incremented when rotation is detected on wheels illustrated in the column. For example, when rotation is detected on a right front wheel, counters CntAB, CntAC, and CntAD are reset to zero, and counters CntBA, CntCA, and CntDA are incremented. With this counter configuration, it is possible to count the number of times of rotation detection of a wheel other than a certain wheel between the rotation detection and the next rotation detection of the certain wheel.

FIG. 9 is a flowchart for specifically describing a procedure of calculating the number of counts between counts between wheels by using the configuration of the counter in FIG. 8. The procedure illustrated in this flowchart is, for example, executed by the wheel speed pulse counting unit 31 for each control cycle of the system.

First, the wheel speed pulse counting unit 31 duplicates each count value of a counter of a current value at that time to a counter configured to hold a previous value with the same configuration as the counter configuration illustrated in FIG. 8 (referred to as a current value counter and a previous value counter, respectively) (S11). Specifically, a previous value counter Cntxy_z corresponding to a current value counter Cntxy is defined. Here, x and y are any of A, B, C, and D, and are different from each other. The wheel speed pulse counting unit 31 implements Cntxy_z=Cntxy for all combinations of x and y.

Next, the wheel speed pulse counting unit 31 checks whether or not rotation is detected for each wheel, and resets a count value of a row of a wheel for which rotation has been detected to return to zero for the current value counter (S12). Next, the wheel speed pulse counting unit 31 increments a count value of a column of a wheel for which rotation has been detected by one, for both the current value counter and the previous value counter (S13).

As a result, when rotation of one wheel has been detected in the control cycle, the own vehicle position estimation unit 41 can obtain the number of times rotation of the other wheel has been detected while the rotation of the one wheel has been detected twice if referring to the previous value counter belonging to a row of the one wheel.

Note that, if this control cycle of the vehicle control system is defined by a unit time (for example, 10 ms), it is difficult to identify the time sequence relationship if rotation has been detected on a plurality of wheels within the same time (same control timing). In the description with reference to FIGS. 8 and 9, the number of times of rotation detection of the other wheel during twice of rotation detection of the wheel also includes the number of times the rotation of the other wheel has been detected at the same control timing as the rotation detection of the wheel. Thus, it is likely to count the rotation of the other wheel more than the actual rotation.

On the other hand, if the rotation detection at the same control timing is not included, it is likely to count the rotation of the other wheel less than the actual rotation. This means that reverse rotation is erroneously determined as forward rotation, and forward rotation is erroneously determined as reverse rotation. Whether or not to include the rotation detection at the same control timing is determined in advance depending on which erroneous determination has a large effect on the system.

Figure 10:
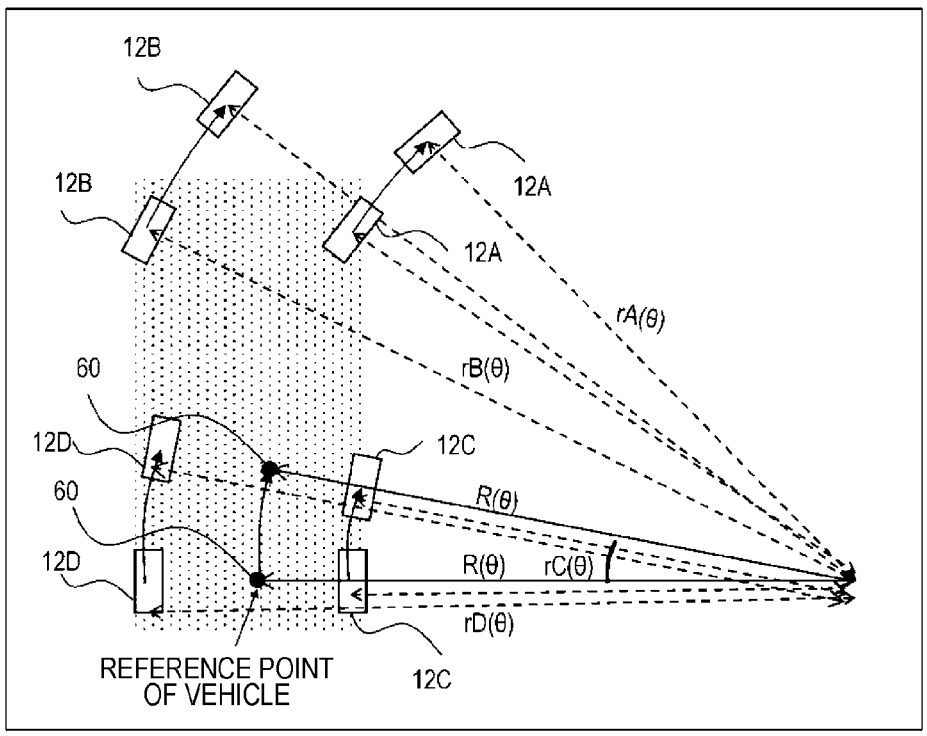
FIG. 10 is a view for describing a concept of a rotation detection travel distance with a travel distance of the vehicle and a positional relationship of each wheel.

FIG. 10 is a view for describing a concept of a rotation detection travel distance with a travel distance of the vehicle and a positional relationship of each wheel. The travel distance of the vehicle is defined as a movement distance (traveling distance) of one point (reference point (predetermined position): for example, a center of a rear axle) on the vehicle. The travel distance of the vehicle and a travel distance (rolling distance) of each wheel do not match except the time of traveling straight. During turning of the vehicle, the travel distance of the vehicle and the travel distance of each wheel are proportional to a turning radius at each position. For wheels that pass the outer side of the rear axle center during turning, the number of times of rotation detection per travel distance of the vehicle increases as compared with the time of traveling straight. For wheels that pass the inner side of the rear axle center during turning, the number of times of rotation detection per travel distance of the vehicle decreases as compared with the time of traveling straight.

Here, the travel distance of the vehicle per wheel rotation detection is defined as the rotation detection travel distance.

Rotation detection travel distance=Rotation detection length*Travel distance of reference point of vehicle/Travel distance of wheel. During turning of the vehicle, it is possible to obtain "Rotation detection travel distance=Rotation detection length*Turning radius of reference point of vehicle/Turning radius of wheel".

An example of specific calculation methods is given as follows. As illustrated in FIG. 10, a reference point of a vehicle is set to a rear axle center point 60. A turning radius of the vehicle when a steering angle is θ, that is, a turning radius of the reference point 60 is expressed as R(θ). Turning radii at the respective positions of the right front wheel 12A, the left front wheel 12B, the right rear wheel 12C, and the left rear wheel 12D when the steering angle is θ are expressed as rA(θ), rB(θ), rC(θ), and rD(θ), respectively. A rotation detection length of the wheel $12x$ (x is any of A to D) is expressed as Lx, and a turning radius thereof is expressed as rx(θ).

A rotation detection travel distance Lpx of the wheel $12x$ is expressed by the following formula.

$$Lpx=Lx*R(\theta)/rx(\theta)$$

In the above example, the turning radius is a function of the steering angle θ, but may be a function of a value of, for example, a global positioning system (GPS), an acceleration sensor, a yaw rate sensor, or the like. Further, the turning radius may be estimated from an immediately previous vehicle speed and a rotation detection interval (time) of each wheel.

From these relationships, the following can be derived. For the two wheels $12x$ and $12y$ (x and y are each A, B, C or D, and are different from each other), it is assumed that both the wheels are rotating in a constant direction. When the rotation detection travel distance Lpx of the wheel $12x$ is equal to or more than a rotation detection travel distance Lpy of the wheel $12y$ (Lpx>=Lpy), the rotation of the wheel $12y$ is always detected at least once while the rotation of the wheel $12x$ is detected twice. Otherwise, the rotation detection of the wheel $12x$ for the second time is the rotation detection caused by reverse rotation as described with reference to FIGS. 6A and 6B.

Further, for the two wheels $12x$ and $12y$, it is also assumed that both the wheels are rotating in a constant direction. When the rotation detection travel distance Lpx of the wheel $12x$ is less than the rotation detection travel distance Lpy of the wheel $12y$ (Lpx<Lpy), the rotation of the wheel $12y$ is not detected or detected once, and is not detectable twice or more while the rotation of the wheel $12x$ is detected twice. Otherwise, the rotation detection of the wheel $12x$ for the second time is the rotation detection caused by reverse rotation as described with reference to FIGS. 7A and 7B.

Furthermore, in the case of Lpx<Lpy, three or more times of rotation detection of the wheel $12y$ while the rotation of the wheel $12x$ is detected twice is likely to occur due to the vibrational movement of the wheel. Such rotation detection of the wheel $12y$ detects the same angular position of the wheel $12y$. For example, the first rotation detection and the third rotation detection of the wheel $12y$ after the rotation detection of the wheel $12x$ is the rotation detection caused by forward rotation, and the second rotation detection and the fourth rotation detections are the rotation detection caused by reverse rotation.

That is, the odd-numbered rotation detection of the wheel $12y$ is the rotation detection caused by forward rotation, and the even-numbered rotation detection is the rotation detection caused by reverse rotation. The rotation detection of the wheel $12x$ after the wheel $12y$ rotates forward is the rotation detection caused by forward rotation, and the rotation detection of the wheel $12x$ after the wheel $12y$ rotates reversely is the rotation detection caused by reverse rotation.

Therefore, when Lpx<Lpy and the rotation of the wheel $12y$ is detected an even number of times (not including zero) while the rotation of the wheel $12x$ is detected twice, the second rotation detection of the wheel $12x$ is the rotation detection caused by reverse rotation. Further, when Lpx<Lpy and the rotation of the wheel $12y$ is detected an odd number of times while the rotation of the wheel $12x$ is detected twice, the second rotation detection of the wheel $12x$ is the rotation detection caused by forward rotation.

Between these, the latter determination logic can be expanded as follows in combination with the determination logic when Lpx>=Lpy. When the rotation of the wheel $12y$ is detected an odd number of times while the rotation of the wheel $12x$ is detected twice, the second rotation detection of the wheel $12x$ is the rotation detection caused by forward rotation.

Figure 11:
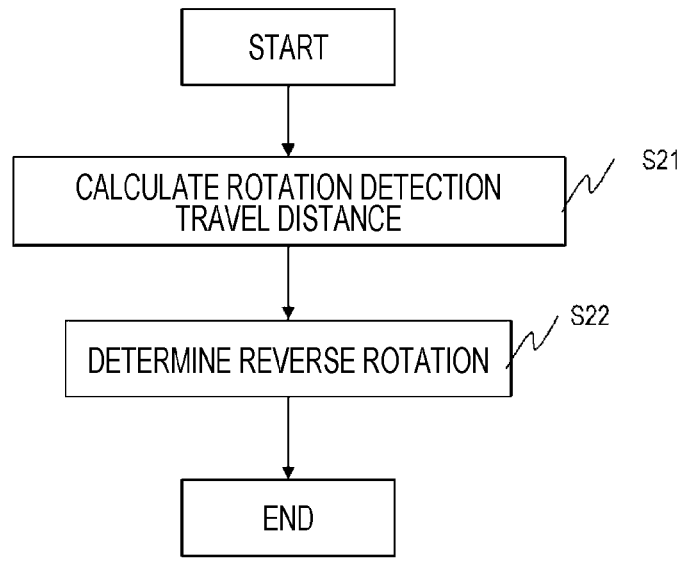
FIG. 11 is a flowchart illustrating a process for determining whether or not wheel rotation detection is caused by reverse rotation.

FIG. 11 is a flowchart illustrating a process for determining whether or not wheel rotation detection is caused by reverse rotation. The process illustrated in this flowchart is performed when rotation is detected on any of the wheels, and is performed after the process described with reference to FIG. 9 is performed. When the reverse rotation can occur only during traveling at a low speed, the process illustrated in this flowchart may be performed only during traveling at the low speed lower than a preset vehicle speed.

First, the own vehicle position estimation unit 41 calculates rotation detection travel distance LpA, LpB, LpC, and LpD of the respective wheels by the method described with reference to FIG. 10 (S21).

The reference point and turning radii of the respective wheels are defined in advance by, for example, the function of the steering angle, and the own vehicle position estimation unit 41 can acquire information on the steering angle from the steering angle detection unit 51.

Next, the own vehicle position estimation unit 41 determines whether or not the wheels rotate reversely based on the following logic. The own vehicle position estimation unit 41 receives a notification of wheel rotation detection from the wheel speed pulse counting unit 31. When the rotation of the wheel $12x$ is detected, a rotation direction of the wheel $12x$ (selected determination target wheel) is determined by a following method (S22). The own vehicle position estimation unit 41 estimates an own vehicle position based on the rotation direction of the wheel $12x$.

Specifically, for Cntxy_z (y≠x), when Lpx>=Lpy and Cntxy_z=0, the own vehicle position estimation unit 41 determines that the rotation detection of the wheel $12x$ is the rotation detection caused by reverse rotation. When Lpx<Lpy and Cntxy_z=even number, the own vehicle position estimation unit 41 determines that the rotation detection of the wheel $12x$ is the rotation detection caused by reverse rotation. When Cntxy_z=odd number, the own vehicle position estimation unit 41 determines that the rotation detection of the wheel $12x$ is the rotation detection caused by forward rotation. In other cases, the own vehicle position estimation unit 41 determines that the rotation direction of the wheel $12x$ is indefinite.

The own vehicle position estimation unit 41 can acquire a counter value from the wheel speed pulse counting unit 31. For example, the own vehicle position estimation unit 41 selects one wheel $12y$ whose Lpx satisfies the above conditions with respect to Lpx, and determines a rotation direction of the wheel $12x$ based on the counter value of the wheel $12y$.

As described above, the own vehicle position estimation unit 41 determines that a rotation direction of rotation of the determination target wheel $12x$ detected for the second time is a direction opposite to a rotation direction of rotation detected for the first time when the rotation of the reference wheel $12y$ (Lpx>=Lpy) which has a rotation detection travel distance equal to or less than a rotation detection travel distance of the determination target wheel $12x$ is not detected even once while the rotation of the selected determination target wheel $12x$ is detected twice.

Further, the own vehicle position estimation unit 41 determines that a rotation direction of rotation of the determination target wheel $12x$ detected for the second time is a direction opposite to a rotation direction of rotation detected for the first time when the rotation of the reference wheel 12y (Lpx<Lpy) which has the rotation detection travel distance longer than the rotation detection travel distance of the determination target wheel 12x is detected an even number of times while the rotation of the selected determination target wheel 12x is detected twice.

Further, when the rotation of the reference wheel 12y is detected an odd number of times while the rotation of the determination target wheel 12x is detected twice, the own vehicle position estimation unit 41 determines that a rotation direction of rotation of the determination target wheel 12x detected for the second time is the same direction as a rotation direction of rotation detected for the first time.

When the rotation direction is indefinite, the own vehicle position estimation unit 41 can determine the rotation direction of the wheels 12x based on other determination conditions. Examples of the other determination conditions include a drive torque direction, a gradient direction, an acceleration sensor value, past actual data, and the like.

When the rotation detection lengths of the two wheels are equal, that is, when Lx=Ly, the own vehicle position estimation unit 41 can determine whether Lpx>=Lpy or Lpx<Lpy only with a turning direction. When the wheel 12x is located on the inner side of the wheel 12y due to turning, Lpx>=Lpy. When the wheel 12x is located on the outer side of the wheel 12y, Lpx<Lpy.

The own vehicle position estimation unit 41 may use information such as a difference in travel distance between left and right wheels, an acceleration sensor, and a yaw rate sensor, in addition to the information of the steering angle detection sensor 141, as information on the turning direction. In general, the left and right front wheels and the left and right rear wheels have the same rotation detection length, and the present method can be applied to the front wheels or the rear wheels.

From the above viewpoint, if the rotation detection travel distance of the reference wheel 12y is equal to or less than the rotation detection travel distance of the determination target wheel 12x when the vehicle travels straight and the reference wheel passes the outer side of the determination target wheel 12x in the turning of the vehicle, the own vehicle position estimation unit 41 determines that the rotation detection travel distance of the reference wheel 12y is shorter than the rotation detection travel distance of the determination target wheel 12x in the turning.

Figure 12:
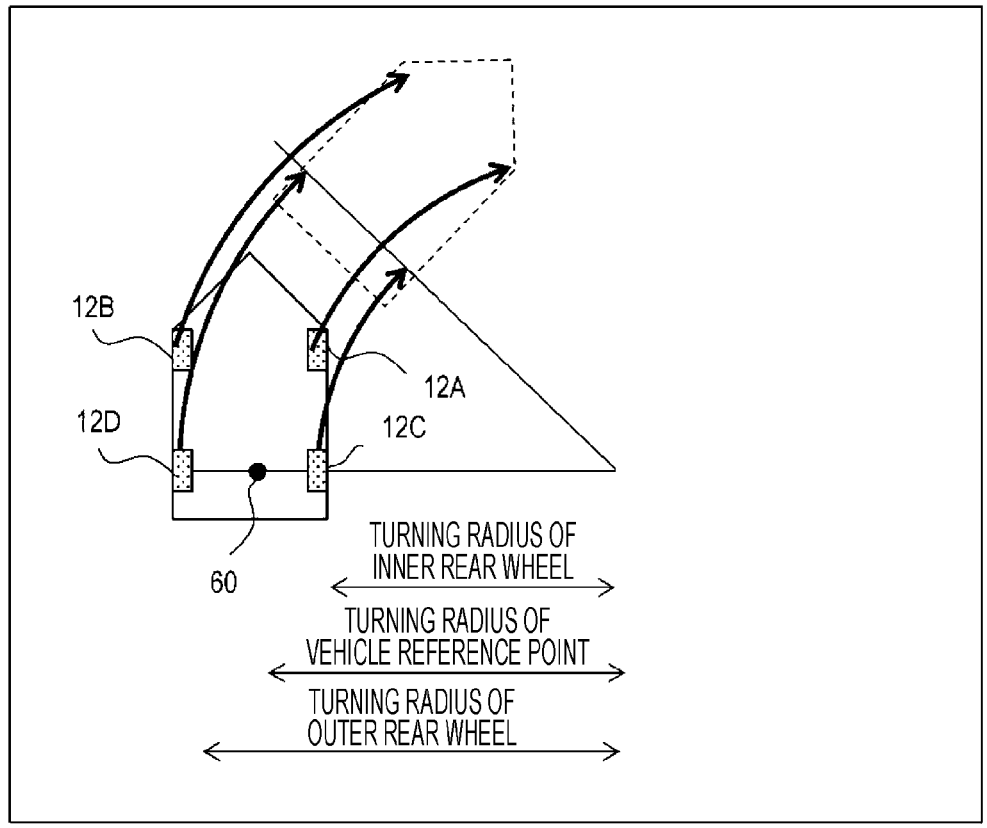
FIG. 12 illustrates a relationship between a reference point and a turning radius of a wheel in a turning vehicle.

FIG. 12 illustrates the relationship between the reference point 60 and the turning radius of the wheel in the turning vehicle. If the wheel 12x is the rear wheel (or non-steered wheel) and the wheel 12y is the front wheel (or steered wheel) that has almost the same trajectory as the wheel 12x when the vehicle travels straight, the turning radius of the wheel 12y is not smaller than that of the wheel 12x regardless of the turning direction of the vehicle. Therefore, if Lx>=Ly, Lpx>=Lpy. For example, a pair of the right rear wheel 12C and the right front wheel 12A, or a pair of the left rear wheel 12D and the left front wheel 12B satisfies this relationship. In this case, information on a turning state such as the steering angle sensor becomes unnecessary.

From the above viewpoint, if the steered wheel and the non-steered wheel have substantially the same trajectory when the vehicle travels straight and the rotation detection travel distance of the steered is equal to or less than the rotation detection travel distance of the non-steered wheel when the vehicle travels straight, the own vehicle position estimation unit 41 determines that the rotation detection travel distance of the steered wheel is equal to or less than the rotation detection travel distance of the non-steered wheel regardless of the turning direction of the vehicle.

As described above, the present embodiment focuses on a wheel for which the count caused by the reverse rotation is desired to be detected, and determines whether rotation directions in the twice of rotation detection of the wheel are the same or opposite to each other from a rotation detection pattern of the other wheel during the twice of rotation detection of the wheel. As a result, it is possible to detect the reverse rotation count of the wheel speed sensor due to vehicle swing-back immediately before the vehicle stop or vehicle bouncing on a step. When the vehicle swing-back or the vehicle bouncing is reflected in the own vehicle position estimation, the own vehicle position estimation accuracy can be improved.

Note that the present invention is not limited to the above-described embodiment, but includes various modifications.

For example, the above-described embodiment has been described in detail in order to describe the invention in an easily understandable manner, and is not necessarily limited to those including the entire configuration that has been described above. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

Further, a part or all of each of the above-described configurations, functions, processing units, and the like may be realized, for example, by hardware by designing with an integrated circuit and the like. Further, the above-described respective configurations, functions and the like may be realized by software by the processor interpreting and executing a program for realizing the respective functions. Information such as programs, tables, and files that realize the respective functions can be installed in a recording device such as a memory, a hard disk, and a solid state drive (SSD), or a recording medium such as an IC card, and an SD card.

Further, only control lines and information lines considered to be necessary for the description have been illustrated, and all of the control lines and information lines required as a product are not necessarily illustrated. It may be considered that most of the configurations are practically connected to each other.

REFERENCE SIGNS LIST 1 vehicle control system
12A to 12D wheel
16A to 16D wheel speed sensor
12A to 12D wheel
12x determination target wheel
12y reference wheel
13 rotor
14 steering mechanism
15 transmission
21 gear position detection unit
31 wheel speed pulse counting unit
40 automatic parking controller
41 own vehicle position estimation unit
51 steering angle detection unit
60 reference point
131 convex portion
132 concave portion 141 steering angle detection sensor
151 gear position detection sensor
161 electrode
162 axis
311 waveform shaping unit
312 rotation detection unit
313 recording unit

The invention claimed is:

1. A vehicle control device that is provided in a vehicle including a plurality of wheels and determines a rotation direction of a wheel included in the plurality of wheels using a sensor that detects rotation of each of the plurality of wheels whenever each of the plurality of wheels passes a predetermined rotation angle position, the vehicle control device comprising:
   a counting unit that counts a rotation detection of each of the plurality of wheels by the sensor; and
   a rotation determination unit that determines a rotation direction of a selected determination target wheel based on a count value of the rotation detection of each of the plurality of wheels obtained by the counting unit,
   wherein a movement distance of each of the plurality of wheels from the rotation detection to a next rotation detection is defined as a rotation detection travel distance of each of the plurality of wheels using a movement distance of a predetermined position of the vehicle as a reference, and
   the rotation determination unit determines that a rotation direction of rotation of a first determination target wheel detected for a second time is a direction opposite to a rotation direction of rotation detected for a first time when the rotation detection is not performed even once for a first reference wheel having a rotation detection travel distance equal to or less than a rotation detection travel distance of the first determination target wheel while the rotation of the first determination target wheel is detected twice.

2. The vehicle control device according to claim 1, wherein
   the rotation determination unit determines that a rotation direction of rotation detected for a second time of a second determination target wheel is a direction identical to a rotation direction of rotation detected for a first time when rotation of a second reference wheel, different from the second determination target wheel, is detected an odd number of times while the rotation of the second determination target wheel is detected twice.

3. The vehicle control device according to claim 1, wherein
   the rotation determination unit determines rotation detection travel distances during turning of the first determination target wheel and the first reference wheel based on rotation detection travel distances and turning radii of the first determination target wheel and the first reference wheel at a time of traveling straight.

4. The vehicle control device according to claim 1, wherein
   if a rotation detection travel distance of the first reference wheel is equal to or less than a rotation detection travel distance of the first determination target wheel when the vehicle travels straight and the first reference wheel passes an outer side of the first determination target wheel during turning of the vehicle, the rotation determination unit determines that the rotation detection travel distance of the first reference wheel is shorter than the rotation detection travel distance of the first determination target wheel in the turning.

5. The vehicle control device according to claim 1, wherein
   if the first reference wheel is a steered wheel, the first determination target wheel is a non-steered wheel, the first reference wheel and the first determination target wheel have a substantially similar trajectory when the vehicle travels straight, and a rotation detection travel distance of the first reference wheel is equal to or less than a rotation detection travel distance of the first determination target wheel when the vehicle travels straight, the rotation determination unit determines that the rotation detection travel distance of the first reference wheel is equal to or less than the rotation detection travel distance of the first determination target wheel regardless of a turning direction of the vehicle.

6. A vehicle control device that is provided in a vehicle including a plurality of wheels and determines a rotation direction of a wheel included in the plurality of wheels using a sensor that detects rotation of each of the plurality of wheels whenever each of the plurality of wheels passes a predetermined rotation angle position, the vehicle control device comprising:
   a counting unit that counts a rotation detection of each of the plurality of wheels by the sensor; and
   a rotation determination unit that determines a rotation direction of a selected determination target wheel based on a count value of the rotation detection of each of the plurality of wheels obtained by the counting unit,
   wherein a movement distance of each of the plurality of wheels from the rotation detection to a next rotation detection is defined as a rotation detection travel distance of each of the plurality of wheels using a movement distance of a predetermined position of the vehicle as a reference, and
   the rotation determination unit determines that a rotation direction of rotation of a first determination target wheel detected for a second time is a direction opposite to a rotation direction of rotation detected for a first time when the rotation detection is performed an even number of times for a first reference wheel having a rotation detection travel distance longer than a rotation detection travel distance of the first determination target wheel while the rotation of the first determination target wheel is detected twice.

7. The vehicle control device according to claim 6, wherein
   the rotation determination unit determines that a rotation direction of rotation detected for a second time of a second determination target wheel is a direction identical to a rotation direction of rotation detected for a first time when rotation of a second reference wheel, different from the second determination target wheel, is detected an odd number of times while the rotation of the second determination target wheel is detected twice.

8. The vehicle control device according to claim 6, wherein
   the rotation determination unit determines rotation detection travel distances during turning of the first determination target wheel and the first reference wheel based on rotation detection travel distances and turning radii of the first determination target wheel and the first reference wheel at a time of traveling straight.

9. The vehicle control device according to claim 6, wherein if a rotation detection travel distance of the first determination target wheel is equal to or less than a rotation detection travel distance of the first reference wheel when the vehicle travels straight and the first determination target wheel passes an outer side of the first reference wheel during turning of the vehicle, the rotation determination unit determines that the rotation detection travel distance of the first determination target wheel is shorter than the rotation detection travel distance of the first reference wheel in the turning.

* * * * *